US008336963B1

(12) United States Patent  
DeMonaco

(10) Patent No.: US 8,336,963 B1  
(45) Date of Patent: Dec. 25, 2012

(54) REMOVABLE ARMREST

(76) Inventor: Marca F. DeMonaco, San Dimas, CA (US)

( * ) Notice: Subject to any disclaimer, the term of this patent is extended or adjusted under 35 U.S.C. 154(b) by 212 days.

(21) Appl. No.: 12/807,445

(22) Filed: Sep. 7, 2010

(51) Int. Cl.  
*B60N 2/46* (2006.01)

(52) U.S. Cl. ......... 297/411.23; 297/411.24; 297/411.26; 297/411.27; 297/411.46

(58) Field of Classification Search ............... 297/411.23–411.27, 411.46, 227, 297/228, 228.12  
See application file for complete search history.

(56) References Cited

U.S. PATENT DOCUMENTS

| | | | | |
|---|---|---|---|---|
| 319,491 A * | 6/1885 | King | ................................ | 5/29 |
| 1,890,102 A * | 12/1932 | Urquhart | ................. | 297/411.23 |
| 2,505,463 A * | 4/1950 | Crane | ..................... | 297/411.24 |
| 2,704,114 A * | 3/1955 | Williams | ................. | 297/188.16 |
| 3,695,691 A * | 10/1972 | Putnam | ......................... | 297/223 |
| 4,022,502 A * | 5/1977 | Smith et al. | .............. | 297/411.23 |
| 4,274,673 A * | 6/1981 | Kifferstein | .................... | 297/220 |
| 4,285,544 A * | 8/1981 | Zapf | ........................ | 297/440.21 |
| 5,147,110 A * | 9/1992 | Syers | ............................ | 297/397 |
| 5,282,598 A * | 2/1994 | Greene | ...................... | 248/311.2 |
| 5,906,413 A * | 5/1999 | Yang | .......................... | 297/284.5 |
| 5,911,472 A * | 6/1999 | Toth | ........................... | 297/188.2 |
| D595,980 S * | 7/2009 | Walters | ......................... | D6/491 |

* cited by examiner

*Primary Examiner* — Laurie Cranmer  
(74) *Attorney, Agent, or Firm* — Albert O. Cota

(57) ABSTRACT

A removable armrest (RAR) (10) that is placed between a pair of sofa cushions (84). The RAR (10) is comprised of a resilient section (12) and a downward-extending tab (32). The tab (32) is divided by a tab welt (48) into an upper section (50) and a lower section (52). The upper section (50) is inserted into and maintained within a slot (54) that extends into the resilient section (12). The lower section (52) of the tab (32) is pushed downward into the space between two cushions (84) on a sofa (82), thereby positioning and frictionally holding the RAR (10) to provide a comfortable support for a person's arm.

3 Claims, 8 Drawing Sheets

REMOVABLE ARMREST

TECHNICAL FIELD

The invention generally pertains to armrests, and more particularly to a removable armrest (RAR) that is attached between two cushions on a sofa.

BACKGROUND ART

One of the most ubiquitous pieces of furniture utilized is a sofa or couch. Sofas have been in use for hundreds of years and during that time the design of a sofa has changed. A typical modern sofa consists of an upholstered elongated structure having multiple cushions that are arranged side-by-side. Located at the right and left ends of a sofa are armrests that extend upward.

This design has generally proved popular and been accepted by the majority of consumers. There is one deficiency in the design, though. The previously described armrests provide a means by which a person sitting on either end of a sofa can rest one of their arms in a comfortable position. Most sofas are large enough to allow at least three, and usually four, people to sit thereon. That means that the one or two people in the middle do not have any means of resting their arms in an elevated comfortable position.

Obviously, what is needed is an armrest that will provide a comfortable arm support for a person who is sitting away from the ends of a sofa. Optimally, the armrest will be removable and be designed for use with any sofa that has multiple cushions. By providing an armrest such as this, a person can be assured that at any location, on any sofa where they sit, they will have a comfortable means of supporting one of their arms.

DISCLOSURE OF THE INVENTION

The removable armrest (RAR) is designed to be placed between a pair of sofa cushions. The RAR is essentially comprised of two elements, a resilient section and a downward-extending tab.

The resilient section has an outer surface, a right surface, a left surface, a slot and a cover that encloses the resilient section. There is a right welt located on the cover's right surface, and a left welt located on the cover's left surface.

The tab has a front surface, a rear surface, a right edge, a left edge, an upper edge, a lower edge and a cover. There is also a tab welt on the cover, which divides the tab into an upper section and a lower section.

The resilient section is preferably circular shaped and is made of a material that is selected from the group consisting of polyurethane foam, polyester fiber or blended cotton batting. The tab is square or rectangular shaped and is made of plastic, wood or metal. The cover for the resilient section and the tab is made of polyester, cotton, leather or suede.

The upper section of the tab is inserted into the slot that extends into the resilient section. The tab is maintained in a downward position within the resilient section by attachment means, which are comprised of staples, stitching or an adhesive.

With the tab securely extending downward from the resilient section, the lower section of the tab is pushed downward into the space between two sofa cushions, thereby positioning and fictionally holding the RAR to provide a comfortable support for a person's arm. To remove the RAR, a person simply grasps the resilient section and pulls upward until the tab is no longer between the pair of cushions.

In view of the above disclosure, the primary object of the invention is to provide a resilient armrest that allows a person to quickly and easily place or remove an armrest between two cushions on a sofa.

In addition to the primary object of the invention, it is also an object of the invention to provide a removable armrest that:
is easy to use,
can be used with almost any type of sofa that has cushions,
can be made in a variety of sizes,
can be made in a variety of colors to match or compliment the color of a sofa,
can also be used as a head rest,
can be made of a variety of fabrics or other materials,
can be sold along with a sofa or as an aftermarket product,
does not require significant maintenance other than occasional cleaning,
can be made with a tab that is frictionally maintained within the slot on the resilient section, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
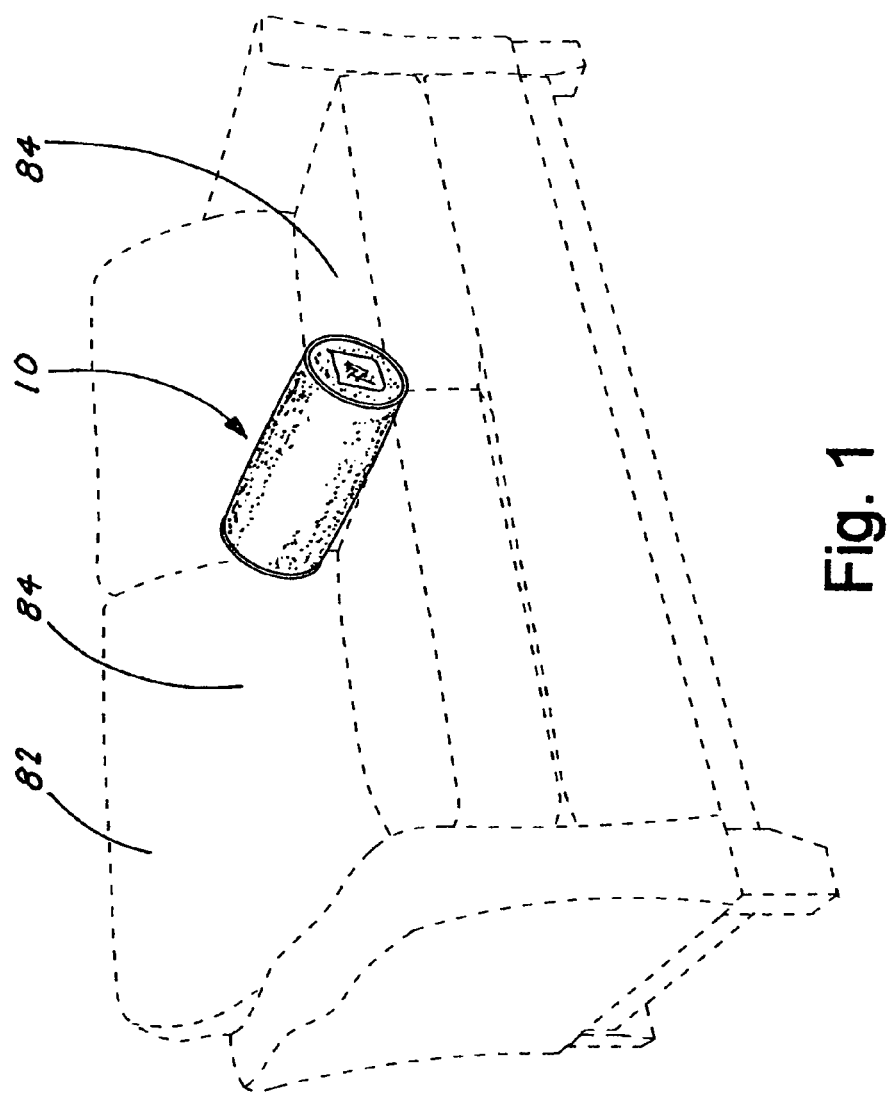
FIG. 1 is an isometric view of a removable armrest (RAR) placed between a pair of cushions and a sofa.

The best mode for carrying out the invention is presented in terms that disclose a preferred embodiment of a removable armrest (RAR) 10. As described herein and shown in the figures, the RAR 10 is designed to be removably placed between a pair of cushions 84 on a sofa 82 to provide a comfortable support for a person's arm, as shown in FIG. 1.

The RAR 10 can be quickly and easily placed on, and removed from, any sofa as long as the sofa utilizes multiple seat cushions.

Figure 2:
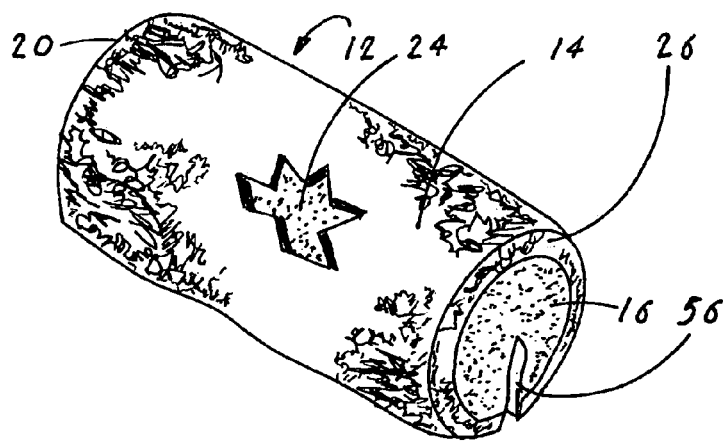
FIG. 2 is an isometric view of the resilient section of the RAR.
Figure 5:
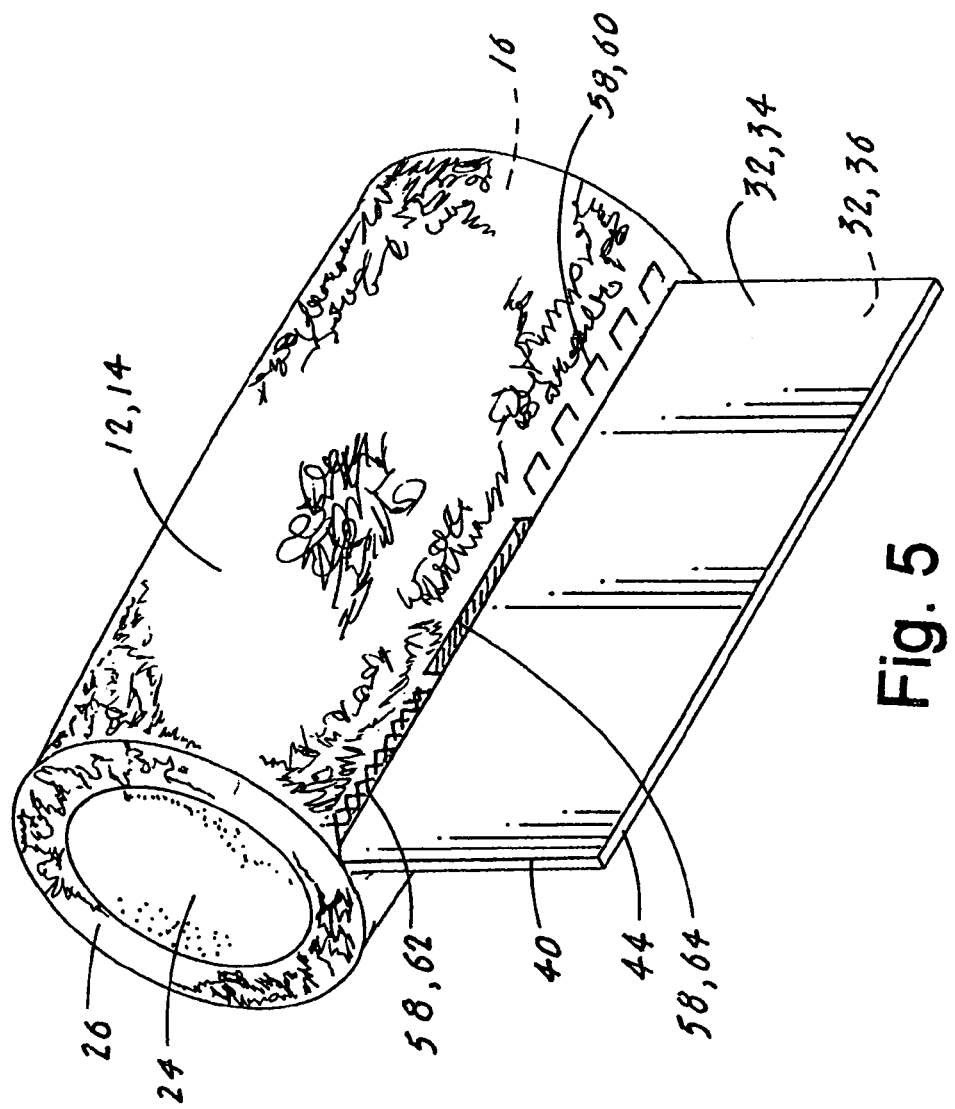
FIG. 5 is an isometric view of the tab inserted into and attached by an attachment means to the resilient section.

As shown in FIGS. 1-13, the RAR 10 is comprised of two major elements, a resilient section 12, and a downward-extending tab 32. The resilient section 12, as shown in FIGS. 1, 2 and 5, is comprised of an outer surface 14, a right surface 16, and a left surface 20. The resilient section 12 is preferably circular in shape, although other shapes including square, inverted U-shaped, pentagonal, hexagonal or octagonal can also be utilized.

The resilient section 12, as shown in FIG. 2, is further comprised of an inner core 24 and an outer layer 26. The inner core 24, which comprises 80-percent of the resilient section 12, is comprised of material that is selected from the group consisting of polyurethane foam, polyethylene foam and ethylene acetate foam. The outer layer 26, which comprises 20-percent of the resilient section 12, is comprised of a material that is selected from the group consisting of polyester fiber, nylon fiber and cloth fiber. The resilient section 12 has a longitudinal length ranging from 12.0 inches (30.48 cm) to 20.0 inches (50.8 cm) and a diameter ranging from 5.0 inches (12.7 cm) to 10.0 inches (25.4 cm).

Figures 3, 4:
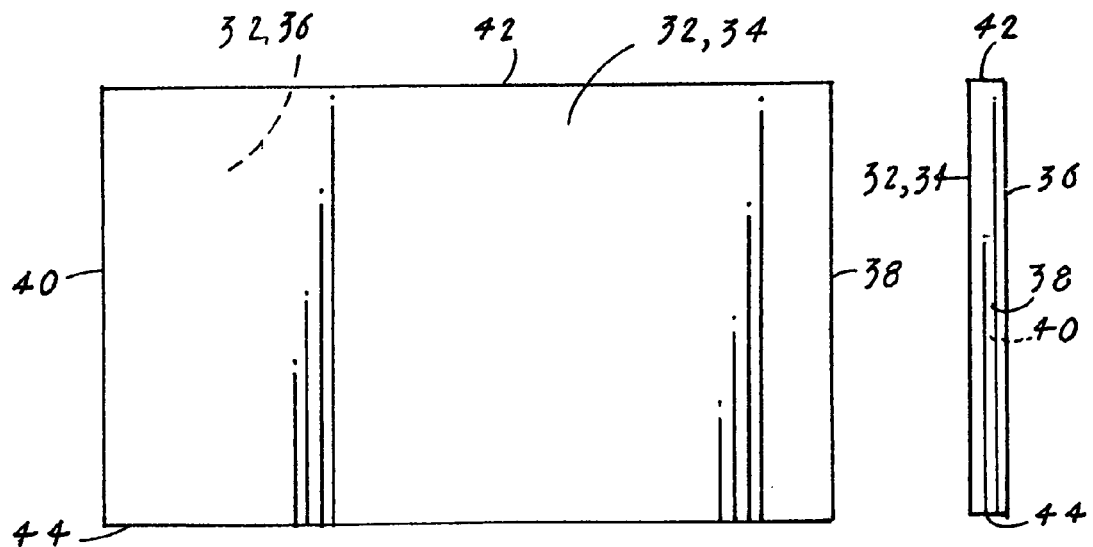
FIG. 3 is a front elevational view of the downward-extending tab of the RAR.
FIG. 4 is a side elevational view of the downward-extending tab of the RAR.
Figure 6:
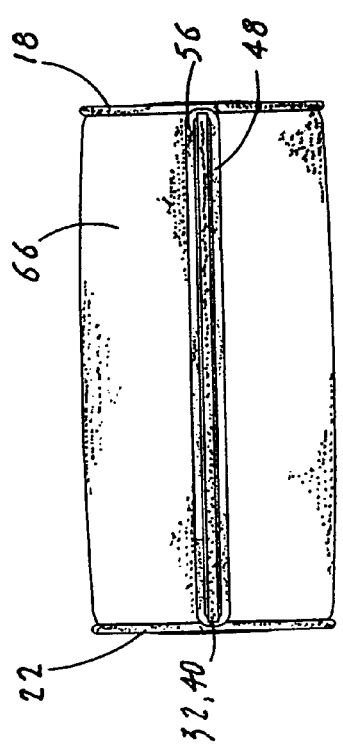
FIG. 6 is a bottom plan view of a cover placed on the resilient section showing a right welt, a left welt and a longitudinal welt around the slot.
Figure 7:
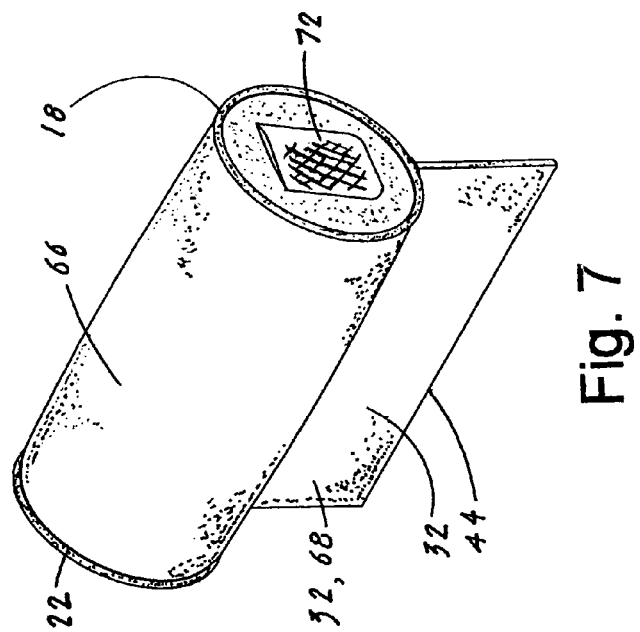
FIG. 7 is an isometric view of a cover placed on the resilient section and the tab.
Figure 8:
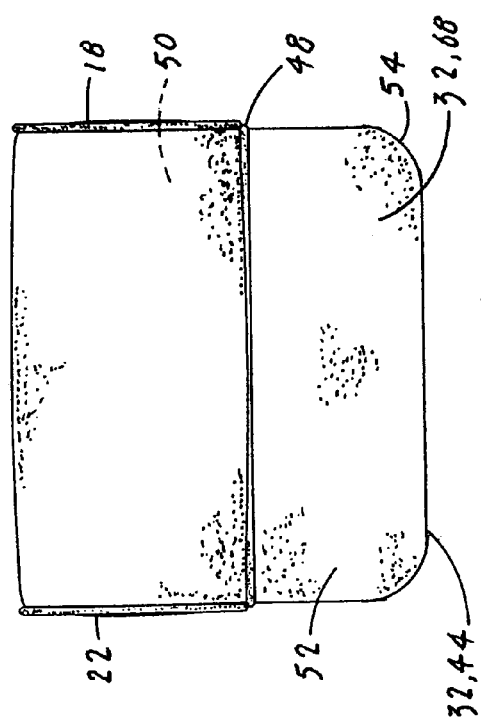
FIG. 8 is a front plan view of a cover placed on the resilient section and the tab showing right and left welts on the resilient section, and a tab welt on the tab.

As shown in FIGS. 3-5, the tab 32 is comprised of a front surface 34, a rear surface 36, a right edge 38, a left edge 40, an upper edge 42 and a lower edge 44. The tab 32 is rectangular shaped and can also have a lower radiused edge 54, as shown in FIG. 8. The tab 32 can be made of a material selected from the group consisting of plastic, wood or metal. As shown in FIGS. 6-8, the resilient section 12 has a cover 66, and the tab 32 also has a tab cover 68. The covers 66,68 are made of a material that is selected from the group consisting of polyester, cotton, leather, suede, a blended fabric, or plastic. The material can also include a stain or water resistant coating. As shown in FIGS. 6-8, circling the perimeter on the cover's right surface is a right welt 18, and on the left surface is a left welt 22. Also, as best shown in FIG. 8, a tab welt 48 extends longitudinally on the tab's cover 68 thereby dividing the tab 32 into an upper section 50 and a lower section 52. The lower section 52 can be covered, and the upper section 50 can remain uncovered, as shown in FIG. 8. All three welts 18,22 and 48 are attached by an attachment means 26 that is preferably comprised of stitching.

Figure 9:
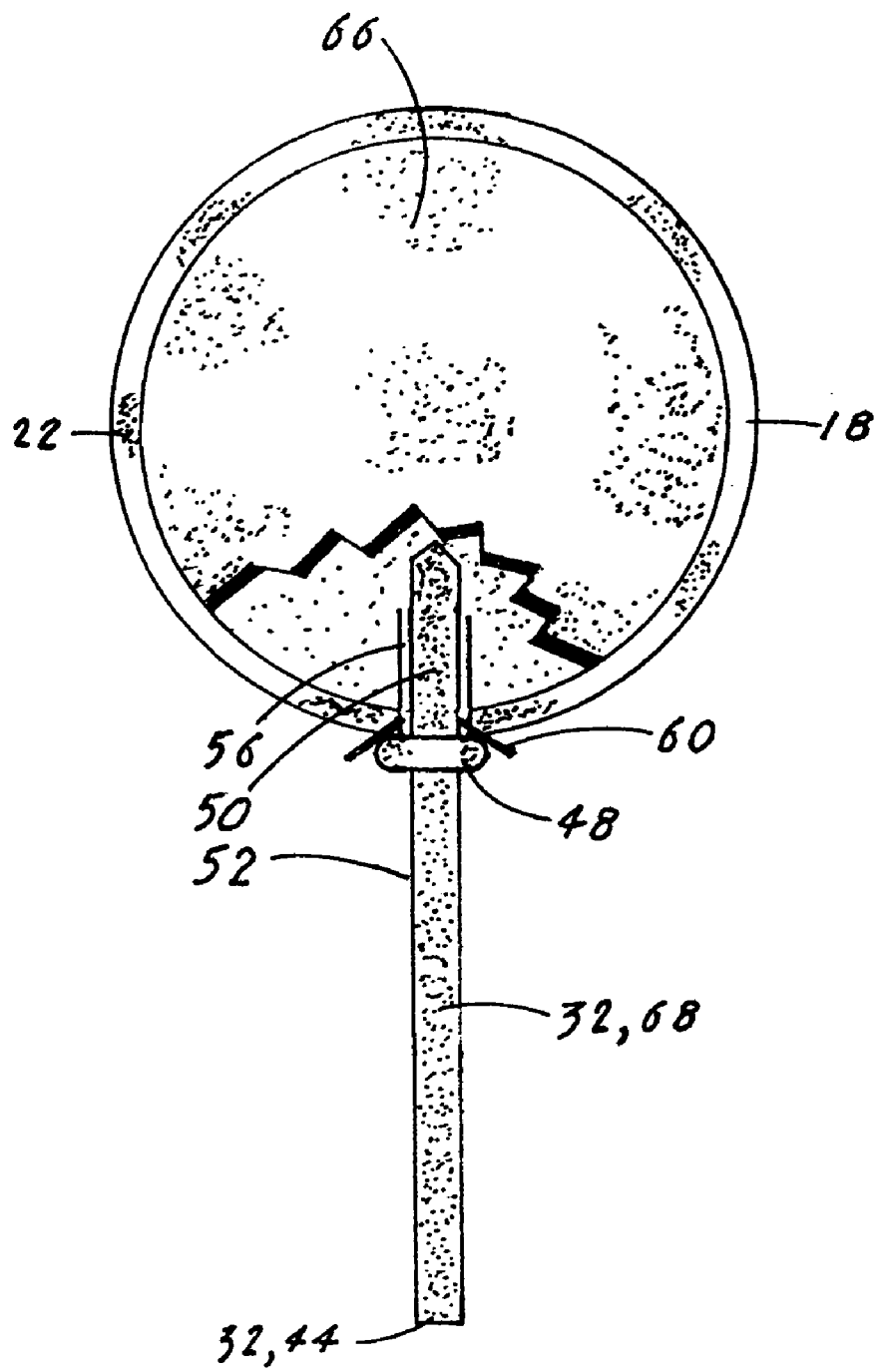
FIG. 9 is a side elevational view of the tab inserted into a slot on the resilient section and attached thereon by staples.

As shown in FIG. 9, the upper section 50 of the tab 32 is inserted into a slot 56 that extends into the resilient section 12. The tab 32 is maintained in a downward position within the resilient section 12 by an attachment means 58, as shown in FIG. 5, which can comprise staples 60, stitching 62 or an adhesive 64.

Figure 10:
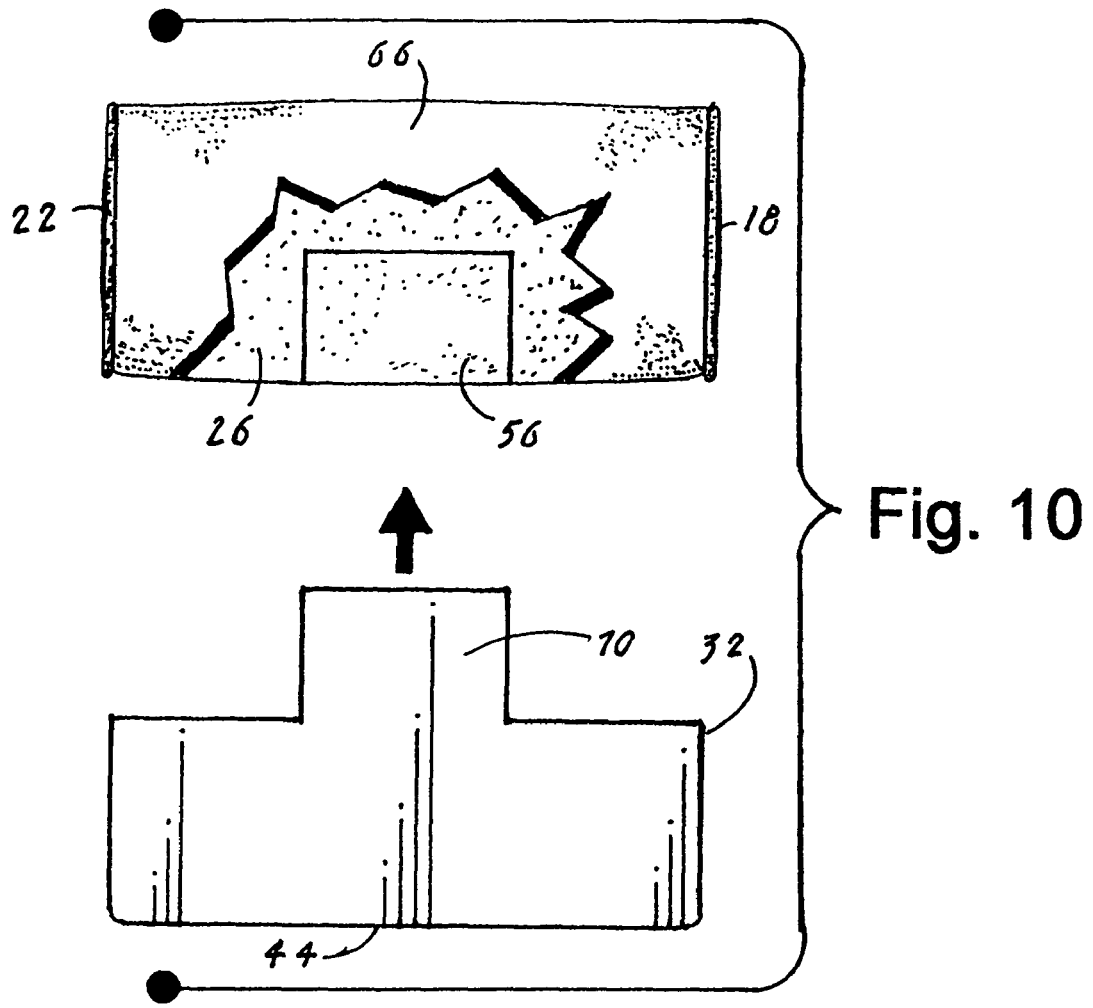
FIG. 10 is a side elevational view showing a tab with an upward-extending secondary tab which is inserted into a corresponding slot on the resilient section.
Figure 11:
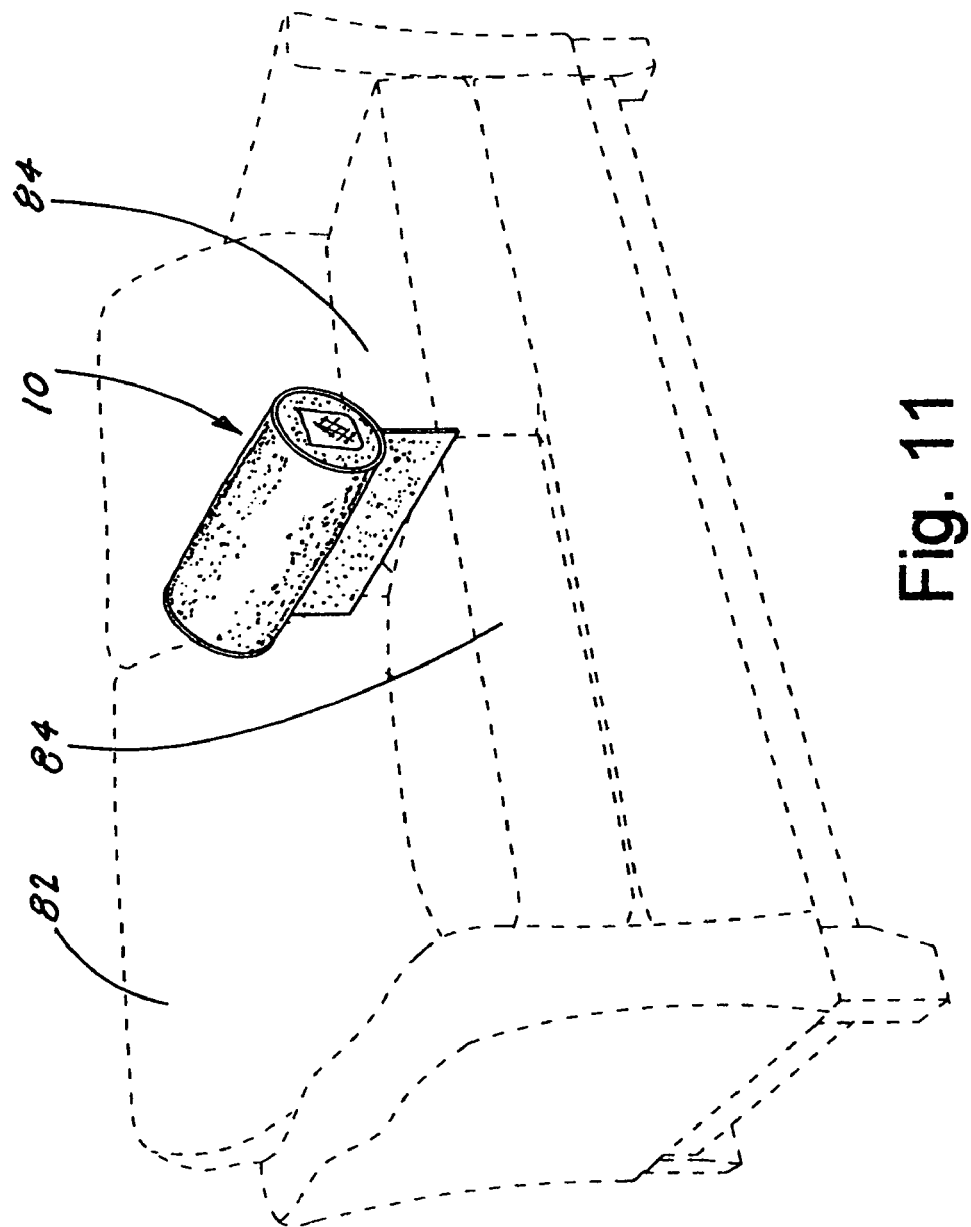
FIG. 11 is an isometric view showing the RAR prior to being inserted between two cushions on a sofa.

A secondary tab 70 can extend upward from the tab's 32 upper edge 42. The secondary tab 70 is smaller than the tab 32 and is inserted into the resilient section 12 via a secondary slot 56 that is dimensioned to accept the secondary tab 70, as shown in FIG. 10. When the secondary tab 70 is inserted the remaining upper edge of the tab 32 interfaces with the surface of the resilient section 12. Once the tab 32 is attached, the lower section 52 of the tab 32 is then pushed downward into the space between two sofa cushions 84, as shown in FIG. 11, thereby positioning and frictionally holding the RAR 10 to provide a comfortable support for a person's arm, as shown in FIG. 1.

Figure 12:
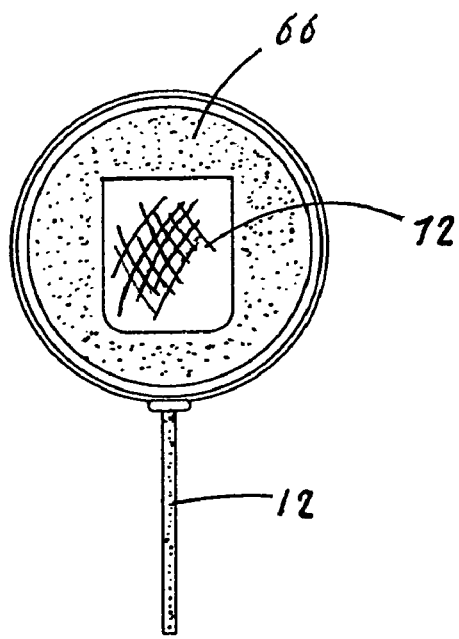
FIG. 12 is a side elevational view of a pocket attached to the side cover of the resilient section.
Figure 13:
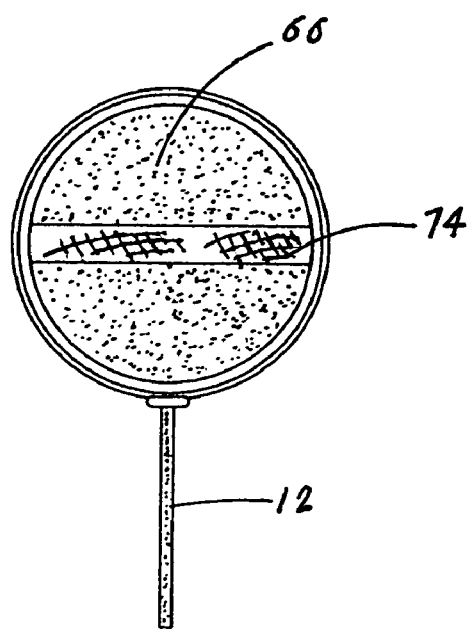
FIG. 13 is a side elevational view of a handle attached to the side cover of the resilient section.

To add to the utility of the RAR 10, a pocket 72, as shown in FIG. 12, or a handle 74, as shown in FIG. 13, can be located on either the cover's right surface or left surface.

In an alternate embodiment, the tab 32 is inserted into the slot 56 on the resilient section 12 and is frictionally held therein. In this design, the force of gravity maintains the resilient section 12 and tab 32 securely in place between two cushions on a sofa.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A removable armrest that is placed between a pair of sofa cushions, wherein said arm cushion is comprised of:
    a) a resilient section having an outer surface, a right surface, a left surface, a slot, a longitudinal length ranging from 12.0 inches (30.48 cm) to 20.0 inches (50.8 cm), and a diameter ranging from 5.0 inches (12.7 cm) to 10.0 inches (25.4 cm),
    b) a rectangular tab having a front surface, a rear surface, a right edge, a left edge, an upper edge, and a lower radiused edge,
    c) a cover that is dimensioned to fit over said resilient section, and that has a right welt and a left welt which are attached by an attachment means,
    d) a cover that is dimensioned to fit over said tab, and that has a tab welt that is attached by the attachment means, wherein said covers are made of a material selected from the group consisting of polyester, cotton, leather and suede, and
    e) attachment means for attaching said tab to said resilient section, wherein said tab welt divides said tab into an upper section and a lower section, wherein the upper section of said tab is inserted into the slot that extends into said resilient section, wherein said tab is maintained in a downward position within said resilient section by said attachment means, wherein the lower section of said tab is then inserted into the space between two cushions on a sofa, thereby positioning and frictionally holding said removable armrest to provide a comfortable support for a person's arm.

2. A removable armrest that is placed between a pair of sofa cushions, wherein said arm cushion is comprised of:
    a) a resilient section having an outer surface, a right surface, a left surface, and a slot,
    b) a tab having a front surface, a rear surface, a right edge, a left edge, an upper edge, and a lower edge,
    c) a cover that is dimensioned to fit over said resilient section, and that has a right welt and a left welt which are attached by an attachment means,
    d) a cover that is dimensioned to fit over said tab, and that has a tab welt that is attached by attachment means, and
    e) attachment means for attaching said tab to said resilient section, wherein said tab welt divides said tab into an upper section and a lower section, wherein the upper section of said tab is inserted into the slot that extends into said resilient section, wherein said tab is maintained in a downward position within said resilient section by said attachment means, wherein the lower section of said tab is then inserted into the space between two cushions on a sofa, thereby positioning and frictionally holding said removable armrest to provide a comfortable support for a person's arm, wherein said means for attaching said tab to said resilient section comprises a secondary tab that extends upward from the upper edge of said tab, wherein the secondary tab is inserted into a secondary slot on said resilient section, wherein when inserted, the remaining upper edge on said tab interfaces with the surface of said resilient section.

3. A removable armrest that is placed between a pair of sofa cushions, wherein said arm cushion is comprised of
   a) a resilient section having an outer surface, a right surface, a left surface, and a slot,
   b) a tab having a front surface, a rear surface, a right edge, left edge, an upper edge, and a lower edge,
   c) a cover that is dimensioned to fit over said resilient section, and that has a right welt and a left welt which are attached by an attachment means, and a handle that is located on the right or left surface,
   d) a cover that is dimensioned to fit over said tab, and that has a tab welt that is attached by attachment means, and
   e) attachment means for attaching said tab to said resilient section, wherein said tab welt divides said tab into an upper section and a lower section, wherein the upper section of said tab is inserted into the slot that extends into said resilient section, wherein said tab is maintained in a downward position within said resilient section by said attachment means, wherein the lower section of said tab is then inserted into the space between two cushions on a sofa, thereby positioning and frictionally holding said removable armrest to provide a comfortable support for a person's arm.

\* \* \* \* \*